(12) United States Patent
Holdampf

(10) Patent No.: US 7,306,278 B2
(45) Date of Patent: Dec. 11, 2007

(54) STOW IN FLOOR AUTOMOTIVE SEAT ASSEMBLY

(75) Inventor: Carl J. Holdampf, Farmington Hills, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 157 days.

(21) Appl. No.: 10/528,593

(22) PCT Filed: Oct. 22, 2003

(86) PCT No.: PCT/US03/33537

§ 371 (c)(1),
(2), (4) Date: Mar. 21, 2005

(87) PCT Pub. No.: WO2004/037602

PCT Pub. Date: May 6, 2004

(65) Prior Publication Data

US 2005/0264074 A1    Dec. 1, 2005

Related U.S. Application Data

(60) Provisional application No. 60/420,191, filed on Oct. 22, 2002.

(51) Int. Cl.
*B60N 2/10* (2006.01)
(52) U.S. Cl. ............... 296/65.09; 297/341; 297/334
(58) Field of Classification Search ............ 296/65.09, 296/65.16, 65.08, 65.05, 65.01; 297/340, 297/341, 334, 335, 336
See application file for complete search history.

(56) References Cited

U.S. PATENT DOCUMENTS

| | | | |
|---|---|---|---|
| 1,729,669 A * | 10/1929 | George | 297/51 |
| 3,202,453 A | 8/1965 | Richards | |
| 4,957,321 A | 9/1990 | Martin et al. | |
| 5,195,795 A | 3/1993 | Cannera et al. | |
| 5,890,758 A | 4/1999 | Pone et al. | |
| 5,941,602 A | 8/1999 | Sturt et al. | |
| 5,975,612 A | 11/1999 | Macey et al. | |
| 6,000,742 A * | 12/1999 | Schaefer et al. | 296/65.09 |
| 6,012,755 A | 1/2000 | Hecht et al. | |
| 6,234,553 B1 | 5/2001 | Eschelback et al. | |
| 6,499,787 B2 | 12/2002 | Jach et al. | |
| 6,991,293 B2 * | 1/2006 | Lang et al. | 297/336 |
| 7,121,624 B2 * | 10/2006 | Pejathaya et al. | 297/378.12 |
| 2002/0017797 A1 | 2/2002 | Jach et al. | |
| 2004/0066073 A1 * | 4/2004 | Wagner et al. | 297/337 |
| 2004/0100114 A1 * | 5/2004 | Rhodes et al. | 296/65.09 |
| 2005/0269830 A1 * | 12/2005 | Epaud | 296/65.09 |
| 2006/0061183 A1 * | 3/2006 | White et al. | 297/378.12 |
| 2006/0097538 A1 * | 5/2006 | Villeminey | 296/65.09 |
| 2006/0208520 A1 * | 9/2006 | Trombley et al. | 296/65.09 |
| 2007/0001474 A1 * | 1/2007 | Aufrere et al. | 296/65.01 |

* cited by examiner

*Primary Examiner*—Jason S Morrow
(74) *Attorney, Agent, or Firm*—Clark Hill PLC

(57) ABSTRACT

A seat assembly for an automotive vehicle includes a seat cushion, a seat back, and a recliner mechanism interconnecting the seat back and the seat cushion for selective adjustment of the seat back relative to the seat cushion between a plurality of reclined seating positions and a forwardly folded position. A riser assembly extends between the seat cushion and the floor of the vehicle. The riser assembly includes front and rear legs arranged as a four bar linkage between the seat cushion and the floor for selectively moving the seat cushion between a seating position and a stowed position. The rear legs are fixedly secured to a control rod pivotally supported by the seat cushion. Levers extend between the seat back and the control rod for automatically moving the seat cushion between the seating and stowed positions in response to a movement of the seat back between the respective seating and stowed positions.

24 Claims, 5 Drawing Sheets

STOW IN FLOOR AUTOMOTIVE SEAT ASSEMBLY

This application is the National Stage of International Application No. PCT/US03/33537, filed Oct. 22, 2003, which claims the benefit of Provisional Application No. 60/420,191, filed Oct. 22, 2002.

BACKGROUND OF THE INVENTION

The invention relates to a seat assembly for an automotive vehicle, and more particularly, to a riser assembly for allowing movement of the seat assembly between a seating position and a stowed position folded flat against the floor of the vehicle.

Automotive vehicles include seat assemblies for supporting occupants within the vehicle. Seat assemblies include a seat cushion and a seat back operatively coupled to the seat cushion by a recliner mechanism for allowing selective pivotal adjustment of the seat back relative to the seat cushion between a plurality of reclined seating positions. Typically, the seat back is also movable between any one of the reclined seating positions and a generally horizontal, forwardly folded position to present a load floor surface on the back of the seat back.

It is known in the automotive seating art to mount a four bar linkage between the seat cushion and the floor of the vehicle for moving the seat assembly between a seating position with the seat cushion spaced above the floor of the vehicle and a forwardly folded position with the seat cushion lying against the floor of the vehicle.

However, it remains desirable to provide a seat assembly having a seat cushion automatically movable between the seating and stowed positions in response to pivotal movement of the seat back between the respective seating and forwardly folded positions.

SUMMARY OF THE INVENTION

According to one aspect of the invention, a seat assembly is provided for supporting an occupant above a floor of an automotive vehicle. The seat assembly comprises a seat cushion, a seat back, and a recliner mechanism coupled between the seat back and the seat cushion for selective adjustment of the seat back relative to the seat cushion between a seating position for supporting the back of an occupant seated on the seat assembly and a stowed position overlying the seat cushion. A riser assembly extends between the seat cushion and the floor of the vehicle for selectively moving the seat cushion between a seating position and a stowed position aligned longitudinally along the floor of the vehicle. A lever interconnects the seat back and the riser assembly for automatically moving the seat cushion between the seating and stowed positions in response to movement of the seat back between the respective seating and stowed positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
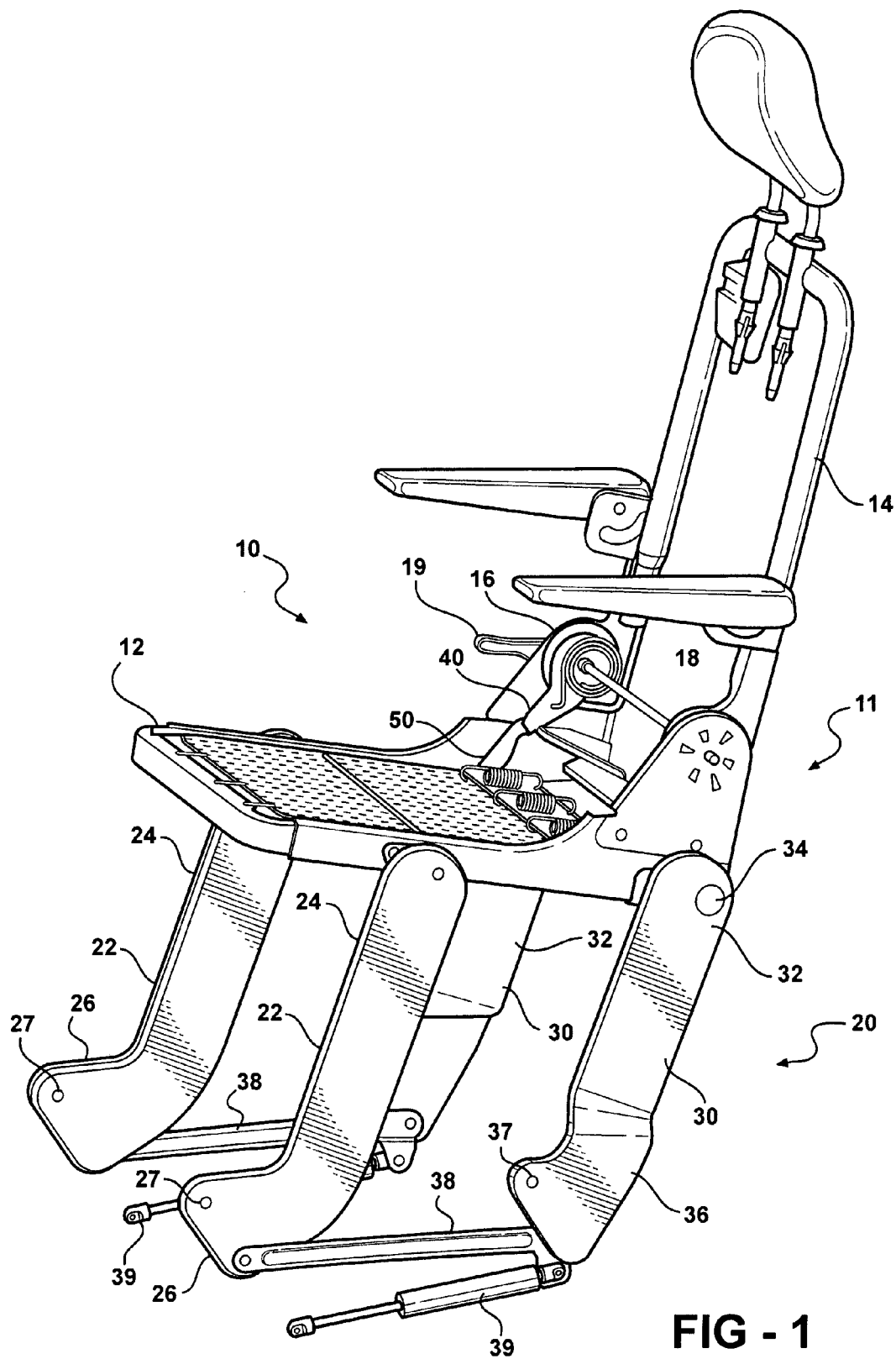
FIG. 1 is a perspective view of a seat assembly in a seating position incorporating one embodiment of the invention.

Referring to the figures, a seat assembly for supporting an occupant above a floor in an automotive vehicle is generally indicated at 10 in FIG. 1. The seat assembly 10 includes a seat cushion 12 and a seat back 14 operatively coupled to the seat cushion 12 by a plurality of recliner mechanisms 16 of any suitable type for supporting the back of the occupant. The recliner mechanisms 16 allow pivotal adjustment and selective locking of the seat back 14 relative to the seat cushion 12 between a plurality of generally upright and reclined seating positions and a forwardly folded position overlying the seat cushion 12. The recliner mechanisms 16 are biased internally, as commonly known by those of ordinary skill in the art, toward the locked position. The seat assembly 10 includes at least one link mechanism 11 operatively connected to the seat back 14 and the seat cushion 12. The at least one link mechanism 11 moves the seat cushion 12 in response to pivotal movement of the seat back 14. A first control rod 18 extends between the recliner mechanisms 16 for synchronized actuation of the recliner mechanisms 16 between locked and unlocked states. A release handle 19 is fixedly secured to the first control rod 18 for facilitating actuation of the recliner mechanisms between the locked and unlocked states. Alternatively, the seat assembly 10 can include a single recliner mechanism 16 movable between the locked and unlocked positions by actuation of the first control rod 18. Further detailed description of the recliner mechanisms 16 is fully set forth in U.S. Pat. No. 5,558,403 issued on Sep. 24, 2000, which is incorporated herein by reference in its entirety.

Figure 3:
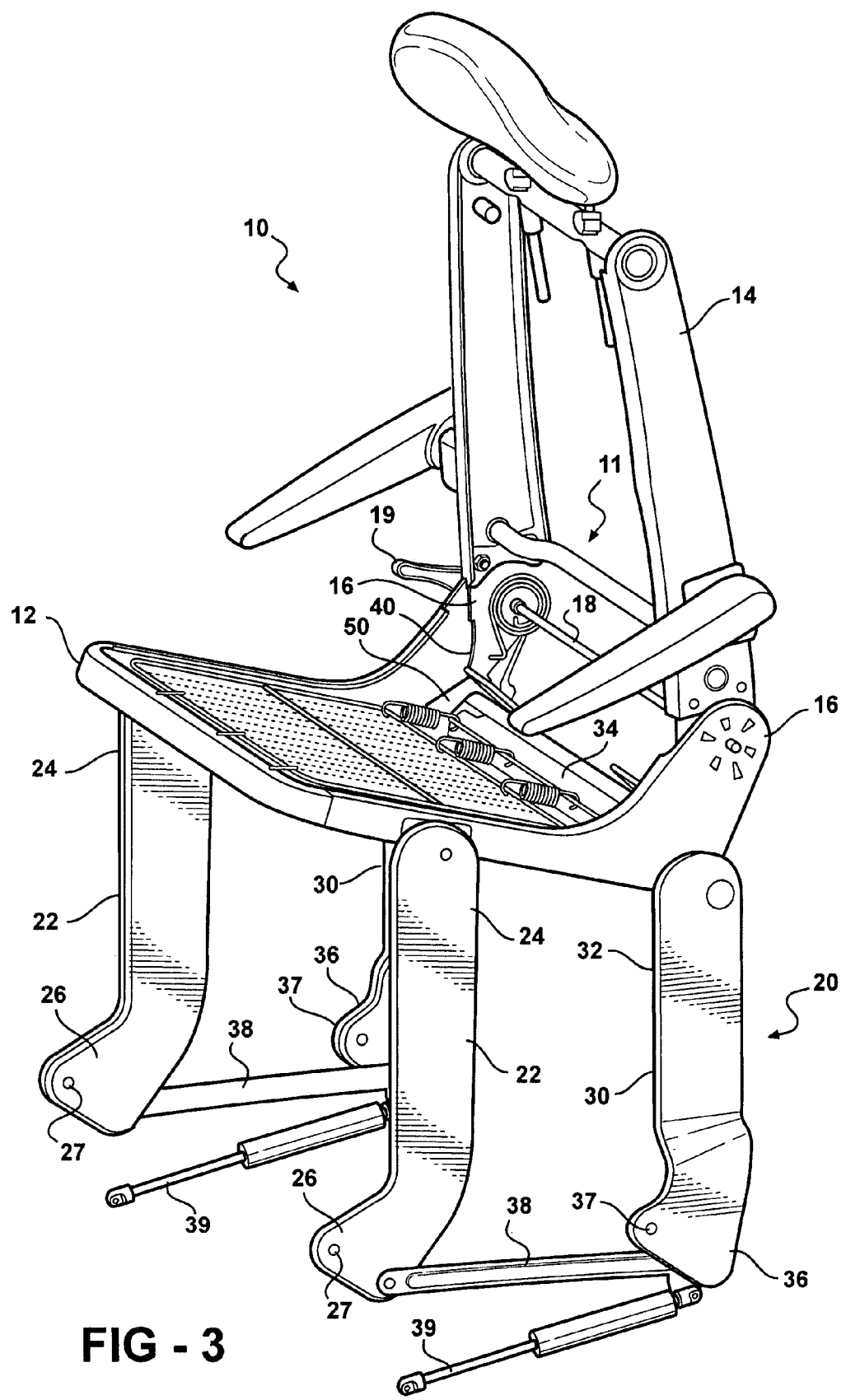
FIG. 3 is a perspective view of the seat assembly in an easy entry position.
Figure 5:
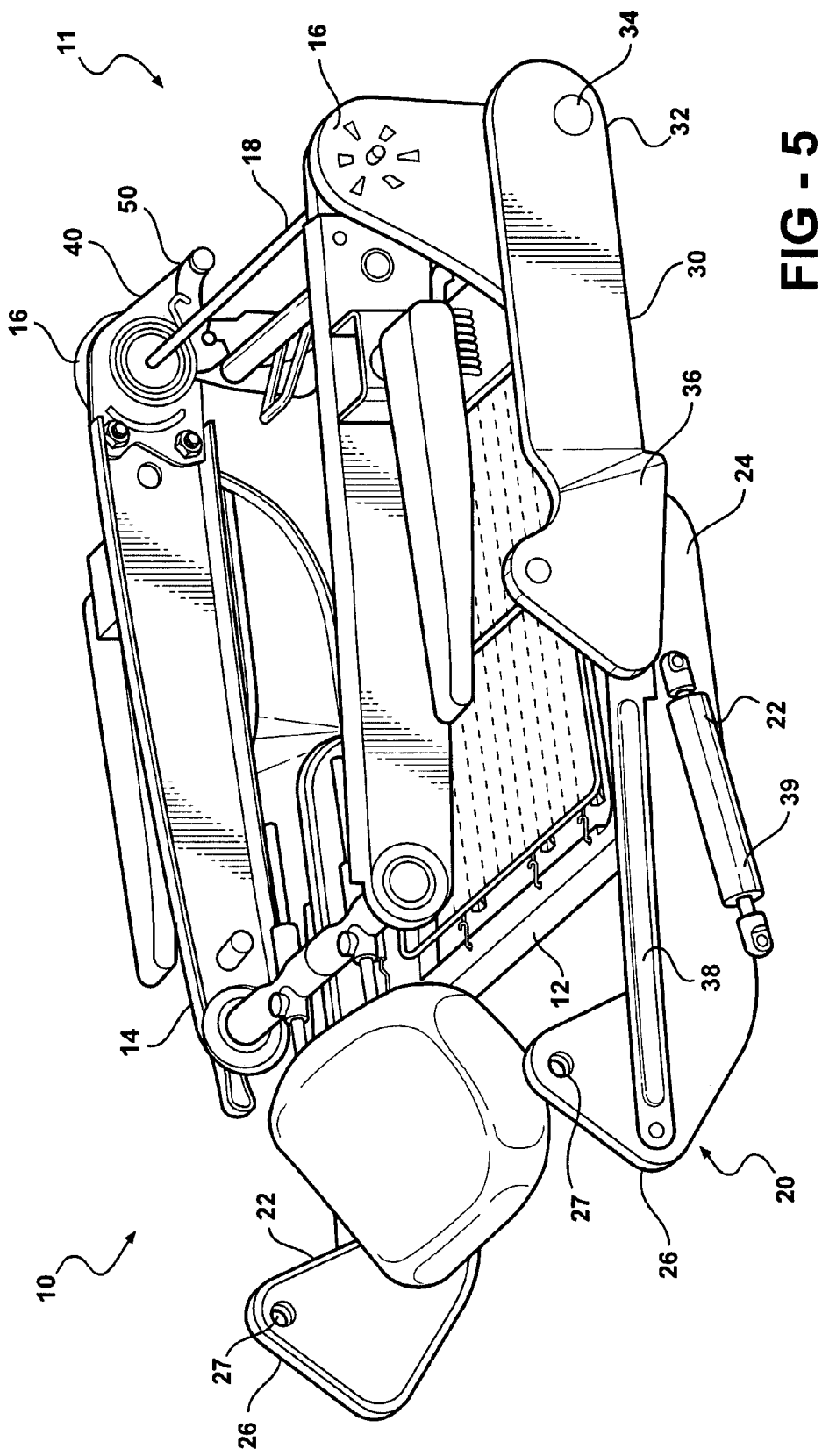
FIG. 5 is a perspective view of the seat assembly in a stowed position.

A riser assembly 20 extends between the seat cushion 12 and the floor of the vehicle for allowing movement of the seat assembly 10 between a seating position, as shown in FIG. 1, an easy entry position, as shown in FIG. 3, and a stowed position, as shown in FIG. 5. The riser assembly 20 includes generally parallel front legs 22 extending between an upper end 24 pivotally coupled to a front portion of the seat cushion 12 and a lower end 26 pivotally coupled to the floor of the vehicle by a front pivot pin 27. The riser assembly 20 also includes generally parallel rear legs 30 extending between an upper end 32 fixedly secured to a second control rod 34 and a lower end 36 pivotally coupled to the floor of the vehicle by a rear pivot pin 37. The second control rod 34 is pivotally supported by a rear portion of the seat cushion 12 for synchronized pivotal movement of the rear legs 30 relative to the seat cushion 12. A link 38 extends between the lower ends 26, 36 of the front 22 and rear 30 legs for stabilizing the movement of the seat assembly 10 between the seating, easy entry, and stowed positions. A dampener 39 extends between the link 36 and the floor of the vehicle.

Figure 2:
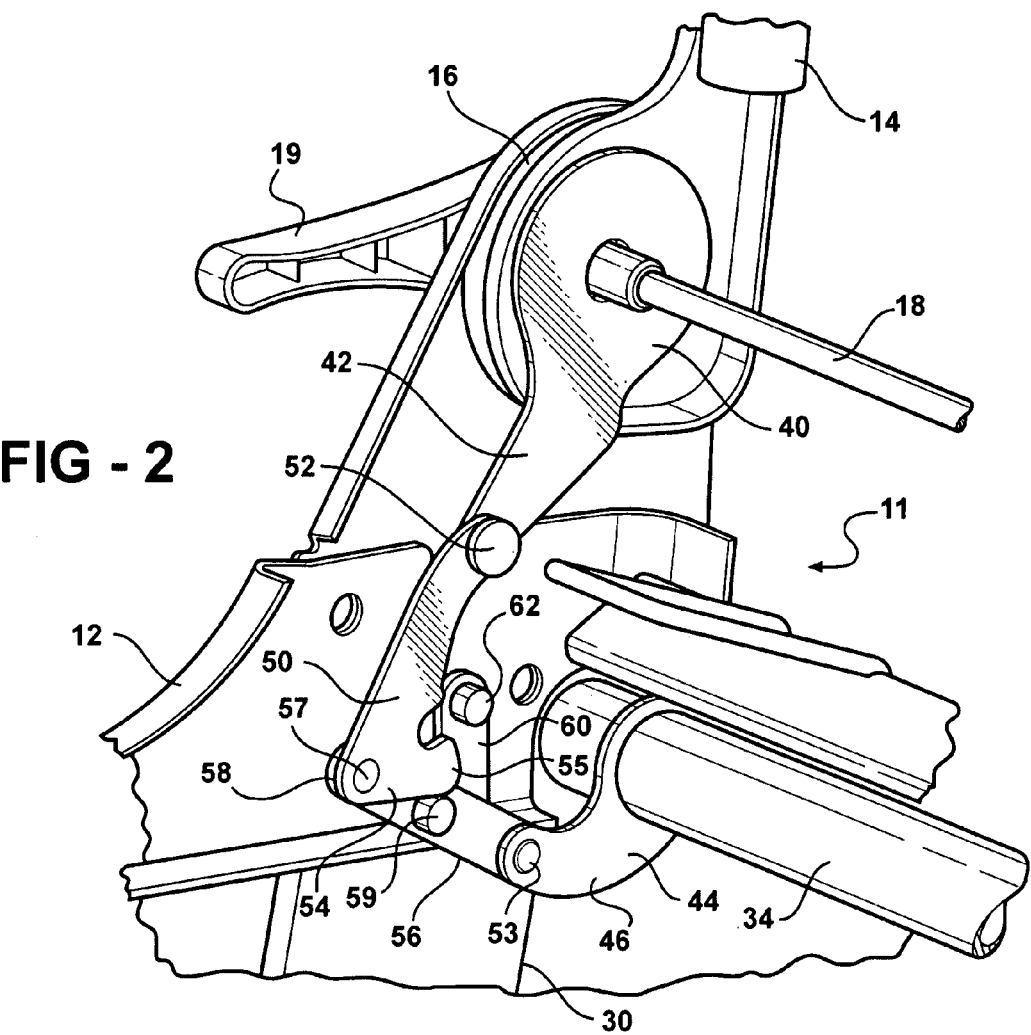
FIG. 2 is an enlarged perspective view of the recliner and levers with the seating position.
Figure 6:
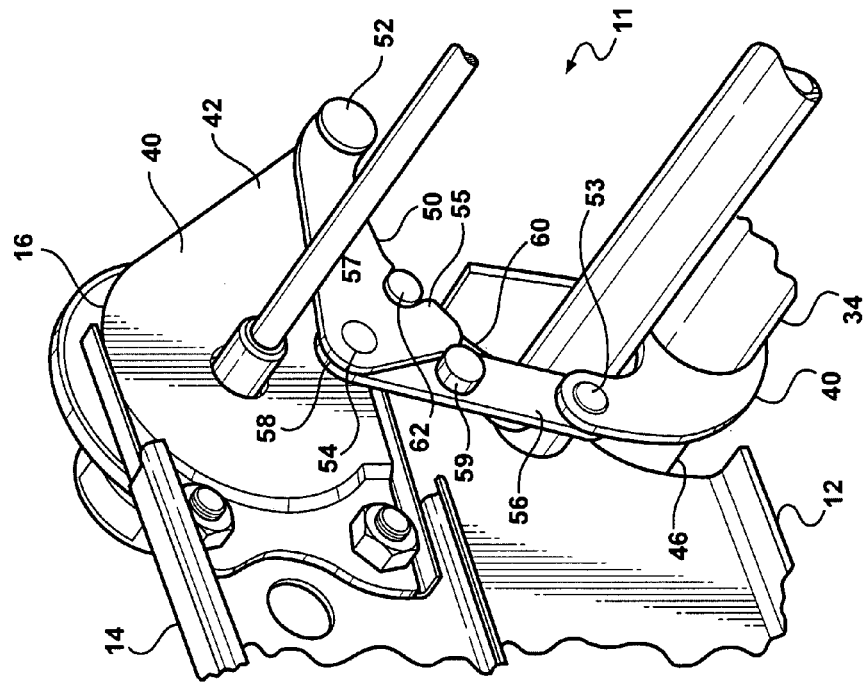
FIG. 6 is an enlarged perspective view of the recliner and levers with the seat assembly in the stowed position.
Figure 4:
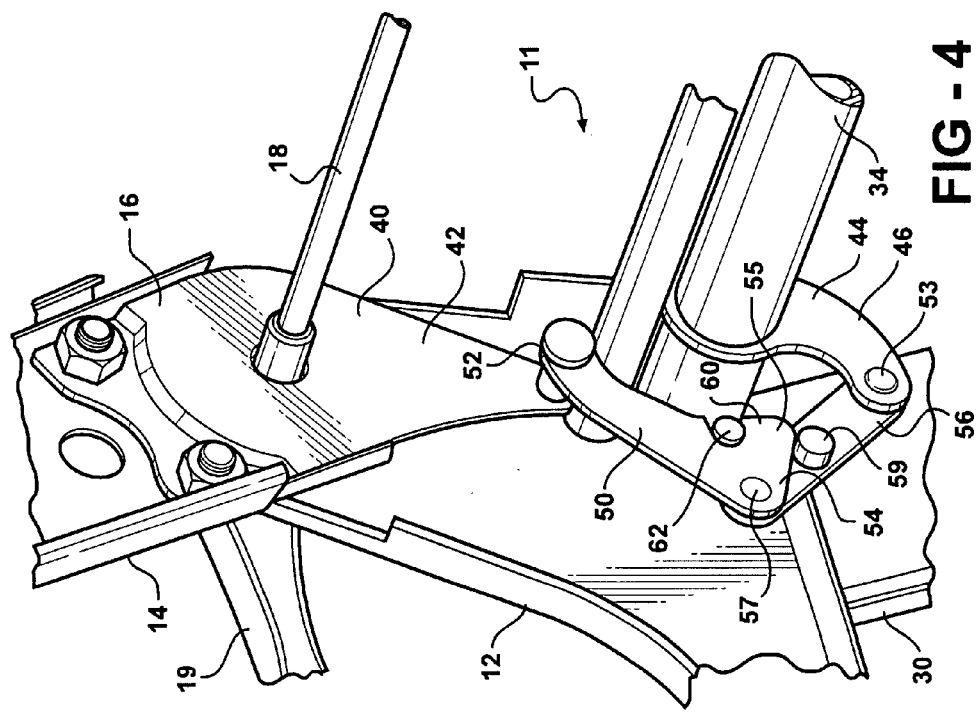
FIG. 4 is an enlarged perspective view of the recliner and levers with the seat assembly in the easy entry position.

Referring to FIGS. 2, 4 and 6, a first lever 40 having a distal end 42 is fixedly secured to the seat back 14 and extends generally radially from the longitudinal axis of the first control rod 18. A second lever 44 having a distal end 46 extends generally radially from the second control rod 34. A first arm 50 is pivotally assembled to the distal end 42 of the first lever 40 by a pivot pin 52. The first arm 50 includes a distal end 54. A hook 55 is formed in the first arm 50 adjacent the distal end 54. A second arm 56 is pivotally assembled to the distal end 46 of the second lever 44 by a pivot pin 53. The second arm 56 includes a distal end 58. The distal ends 54, 58 of the first 50 and second 56 arms are pivotally interconnected by a pivot pin 57. An abutment pin 59 is fixedly secured to the second arm 56 for engaging the first arm 50 when the seat back 14 is moved toward the forwardly folded position, whereby the first 50 and second 56 arms are held at a predetermined angle, as best shown in FIG. 4, for pivotal movement of both the first 50 and second 56 arms together about the pivot pin 53.

A latch arm 60 having a latch pin 62 is pivotally coupled to the second arm 56 for moving the latch pin 62 in and out of hooking engagement with the hook 55 in the first arm 50. Relative pivotal movement between the first 50 and second 56 arms is prevented while the latch pin 62 remains engaged with the hook 55 in the first arm 50. A biasing member (not shown) of any suitable type, such as a clock spring, extends between the latch arm 60 and the second arm 56 for biasing the latch pin 62 out of engagement with the hook 55 in the first arm 50. The latch arm 60 is operatively coupled to an easy entry lever (not shown), or alternatively, to the release lever 19, for actuating the latch pin 62 in and out of engagement with the hook 55.

In operation, an occupant may sit on the seat assembly 10 in the seating position, as shown in FIGS. 1 and 2. The occupant may adjust the seat back 14 between the plurality of reclined seating positions by rotating the control rod 18 with the release lever 19 to actuate the recliner mechanisms 16 to the unlocked position. The first lever 40 rotates with the seat back 14 during adjustment of the seat back 14 between the plurality of reclined seating positions. Additionally, the first 50 and second 56 arms pivot freely about the pivot pins 52, 53, 57 to accommodate the movement of the first lever 40 without moving the second lever 44 during adjustment of the seat back 14 between the plurality of reclined seating positions. The recliner mechanisms 16 are allowed to return to the locked position to maintain the seat back 14 in the desired reclined seating position.

The seat assembly 10 is movable to the easy entry position by unlocking the recliner mechanisms 16 and forwardly tilting the seat back 14, as shown in FIGS. 3 and 4. The latch pin 62 engages the hook 55 to prevent relative pivotal movement between the first 50 and second 56 arms about the pivot pin 57. The movement of the seat back 14 between the plurality of reclined seating positions and the easy entry position pushes the first 50 and second 56 arms to cause counterclockwise movement of both the second lever 44 and the second control rod 34, as viewed from the perspective shown in the figures. The counterclockwise movement of the second control rod 34 urges forward pivotal movement of the front 22 and rear 30 legs about the front 27 and rear 37 pivot pins, respectively. The forward pivotal movement of the front 22 and rear 30 legs forwardly displaces the seat cushion 12. Thus, in the easy entry position, the seat back 14 is forwardly tilted and the seat cushion 12 is forwardly displaced to allow ingress, egress and access behind the seat assembly 10. The recliner mechanisms 16 are returned to the locked position to lock the entire seat assembly 10 in the easy entry position.

When the seat back 14 is pivoted counterclockwise beyond the easy entry position shown in FIGS. 3 and 4 toward the forwardly folded position, the pivotal movement of the first lever 40 pulls the first 50 and second 56 arms to cause clockwise pivotal movement of the second lever 44 and the second control rod 34. In response, the front 22 and rear 30 legs are pivoted rearwardly about the front 27 and rear 37 pivot pins, respectively. The rearward pivotal movement of the front 22 and rear 30 legs displaces the seat cushion 12 rearwardly and downwardly to the stowed position. Thus, continued movement of the seat back 14 beyond the easy entry position toward the forwardly folded position causes the seat assembly 10 to move toward the stowed position, shown in FIGS. 5 and 6.

With the recliner mechanisms 16 in the locked or unlocked positions, the seat assembly 10 can be locked or freely moved, respectively, between the plurality of reclined seating positions, the easy entry position and the stowed position.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly (10) comprising:
   a seat cushion (12) configured for supporting an occupant above a vehicle floor;
   a seat back (14) pivotally coupled to the seat cushion (12);
   a recliner mechanism (16) operatively coupled between the seat back and the seat cushion for providing selective movement of the seat assembly between a plurality of seating positions with said seat back generally inclined relative to the seat cushion and a stowed position with the seat back in a generally folded flat position overlying the seat cushion;
   a riser assembly (20) including a pair of front legs (22) and a pair of rear legs (24), the riser assembly (20) operatively coupled between the seat cushion (12) and the floor of a vehicle for allowing selective movement of the seat assembly between the seating positions and the stowed position;
   a riser control rod (34) rotatably supported by the seat cushion and fixedly secured to each of the pair of rear legs; and
   a link mechanism (11) operatively coupled between the seat back (14) and the riser control rod for allowing free pivotal movement of the seat back relative to the riser control rod in each of the plurality of seating positions and for automatically rotating the riser control rod to simultaneously pivot each of said pair of front and rear legs relative to the floor in response to pivotal movement of the seat back between the seating positions and the stowed position.

2. The seat assembly (10) of claim 1 wherein the link mechanism (11) comprises a first arm having a proximal end pivotally coupled to the seat back and an opposite distal end.

3. The seat assembly (10) of claim 2 wherein the link mechanism (11) further comprises a second arm having a proximal end pivotally coupled to the riser control rod and an opposite distal end pivotally connected to the distal end of the first arm for selectively coupling the seat back to the riser control rod.

4. The seat assembly (10) of claim 3 wherein the first arm includes a hook portion (55) formed thereon adjacent the distal end of the first arm and link mechanism (11) further comprises a latch arm (60) having a first end pivotally connected to the second arm and a second end supporting a latch pin for selective engagement with the hook portion to interlock the first and second arms and thereby couple the seat back to the riser control rod.

5. The seat assembly (10) of claim 4 wherein the link mechanism further includes an abutment pin (59) projecting from the second arm for engaging the first arm to maintain a predetermined angle between the first and second arms.

6. The seat assembly (10) of claim 5 further including a recliner control rod (18) operatively coupled to the recliner mechanism (16) for actuating the recliner mechanism (16) between locked and unlocked states providing selective movement of the seat assembly between the seating positions and the stowed position.

7. The seat assembly (10) of claim 6 wherein the riser assembly further includes a link (38) extending between and interconnecting the front and rear legs (22, 30) for providing simultaneous pivotal movement thereof in response to rotation of the riser control rod.

8. The seat assembly (10) of claim 7 further including a dampener (39) extending between the link (38) and the floor of the vehicle for assisting and controlling movement of the seat assembly (10) between the seating positions and the stowed position.

9. The seat assembly (10) of claim 8 further including a first lever (40) secured to the seat back and extending radially from the longitudinal axis of the recliner control rod, the first lever having a distal end pivotally connected to the first arm by a pivot pin (52).

10. The seat assembly (10) of claim 9 further including a second lever (44) secured to the riser control rod and extending radially from the longitudinal axis thereof, the second lever having a distal end pivotally connected to the second arm by a pivot pin (53).

11. The seat assembly (10) of claim 10 wherein the pair of front legs include an upper end pivotally coupled to the seat cushion and a lower end adapted to be pivotally coupled to the vehicle floor.

12. The seat assembly (10) of claim 1 wherein the pair of rear legs include an upper end fixedly secured to the riser control rod and a lower end adapted to be pivotally coupled to the vehicle floor.

13. A seat assembly (10) comprising:
a seat cushion (12) configured for supporting an occupant above a vehicle floor;
a seat back (14) pivotally coupled to the seat cushion (12);
a recliner mechanism (16) operatively coupled between the seat back and the seat cushion for providing selective movement of the seat assembly between a plurality of seating positions with said seat back generally reclined relative to the seat cushion and an easy entry position with the seat back pivoted forwardly and partially overlying the seat cushion;
a riser assembly (20) including a pair of front legs (22) and a pair of rear legs (24), the riser assembly (20) operatively coupled between the seat cushion (12) and the floor of a vehicle for allowing selective movement of the seat assembly between the seating positions and the easy entry position;
a riser control rod (34) rotatably supported by the seat cushion and fixedly secured to each of the pair of rear legs; and
a link mechanism (11) operatively coupled between the seat back (14) and the riser control rod for allowing free pivotal movement of the seat back relative to the riser control rod in each of the plurality of seating positions and for automatically rotating the riser control rod to simultaneously pivot each of said pair of front and rear legs relative to the floor in response to pivotal movement of the seat back between the seating positions and the easy entry position.

14. The seat assembly (10) of claim 13 wherein the link mechanism (11) comprises a first arm having a proximal end pivotally coupled to the seat back and an opposite distal end.

15. The seat assembly (10) of claim 14 wherein the link mechanism (11) further comprises a second arm having a proximal end pivotally coupled to the riser control rod and an opposite distal end pivotally connected to the distal end of the first arm for selectively coupling the seat back to the riser control rod.

16. The seat assembly (10) of claim 15 wherein the first arm includes a hook portion (55) formed thereon adjacent the distal end of the first arm and link mechanism (11) further comprises a latch arm (60) having a first end pivotally connected to the second arm and a second end supporting a latch pin for selective engagement with the hook portion to interlock the first and second arms and thereby couple the seat back to the riser control rod.

17. The seat assembly (10) of claim 16 wherein the link mechanism further includes an abutment pin (59) projecting from the second arm for engaging the first arm to maintain a predetermined angle between the first and second arms.

18. The seat assembly (10) of claim 17 further including a recliner control rod (18) operatively coupled to the recliner mechanism (16) for actuating the recliner mechanism (16) between locked and unlocked states providing selective movement of the seat assembly between the seating positions and the stowed position.

19. The seat assembly (10) of claim 18 wherein the riser assembly further includes a link (38) extending between and interconnecting the front and rear legs (22, 30) for providing simultaneous pivotal movement thereof in response to rotation of the riser control rod.

20. The seat assembly (10) of claim 19 further including a dampener (39) extending between the link (38) and the floor of the vehicle for assisting and controlling movement of the seat assembly (10) between the seating positions and the stowed position.

21. The seat assembly (10) of claim 20 further including a first lever (40) secured to the seat back and extending radially from the longitudinal axis of the recliner control rod, the first lever having a distal end pivotally connected to the first arm by a pivot pin (52).

22. The seat assembly (10) of claim 21 further including a second lever (44) secured to the riser control rod and extending radially from the longitudinal axis thereof, the second lever having a distal end pivotally connected to the second arm by a pivot pin (53).

23. The seat assembly (10) of claim 22 wherein the pair of front legs include an upper end pivotally coupled to the seat cushion and a lower end adapted to be pivotally coupled to the vehicle floor.

24. The seat assembly (10) of claim 23 wherein the pair of rear legs include an upper end fixedly secured to the riser control rod and a lower end adapted to be pivotally coupled to the vehicle floor.

* * * * *